US007794284B1

(12) United States Patent
He et al.

(10) Patent No.: US 7,794,284 B1
(45) Date of Patent: Sep. 14, 2010

(54) ELECTRIC CONNECTOR WITH IMPROVED CONTACT ARRANGEMENT

(75) Inventors: Jia-Yong He, Kunshan (CN); Qi-Sheng Zheng, Kunshan (CN); Terrance F. Little, York, PA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/462,264

(22) Filed: Jul. 31, 2009

(51) Int. Cl.
*H01R 24/00* (2006.01)

(52) U.S. Cl. ...................................................... 439/660

(58) Field of Classification Search ................. 439/660, 439/607.2, 607.21, 607.4, 607.31
See application file for complete search history.

(56) References Cited

U.S. PATENT DOCUMENTS 5,899,760 A * 5/1999 Ho et al. ..................... 439/135
6,159,040 A * 12/2000 Chang et al. ............. 439/541.5
6,270,379 B1 * 8/2001 Huang et al. ................ 439/660
7,699,663 B1 * 4/2010 Little et al. ................. 439/660

* cited by examiner

*Primary Examiner*—Chandrika Prasad
(74) *Attorney, Agent, or Firm*—Wei Te Chung; Andrew C. Cheng; Ming Chieh Chang

(57) ABSTRACT

An electrical connector (100) defining a receiving opening (7) for receiving a corresponding plug, includes: an insulative housing (1), an optical module (5) retained in the insulative housing (1) and a plurality of contacts (2) attached to the insulative housing (1). The insulative housing (1) has a tongue (11) extending to the receiving opening (7) and a cavity (101) under the tongue (11) and communicating with the receiving opening (7). The optical module (5) has an optical component (52) extending toward the receiving opening (7). Each contact (2) has a contact portion (211, 221) extending to the tongue (11), a tail portion (213, 223) and a body portion (212, 222) connecting the contact portion and the tail portion. The tail portions (213, 223) are arranged in rows along an inserting direction of the plug and located at an outside position of the optical module (5).

14 Claims, 6 Drawing Sheets

21 22 11 4 7 1 223 213

100 4 44 1 113 111 112 43 45 3 32 321 22 222 221 223 21 2121 2122 213 5 511

ELECTRIC CONNECTOR WITH IMPROVED CONTACT ARRANGEMENT

BACKGROUND OF THE INVENTION

1. Field of the Invention

The present invention relates to electrical connectors, more particularly to electrical connectors with improved contact arrangement in order to provide reasonable space for easily receiving an optical module.

2. Description of Related Art

USB 3.0 proposal was standardized by the USB Implementers Forum (USB-IF) at the end of 2008. An USB 3.0 connector includes an insulative housing and USB 2.0 contacts and extension contacts retained therein. Each contact has a tail portion for connecting with a circuit board. The tail portions of the USB 2.0 contacts and the extension contacts are arranged in two rows, wherein the tail portions of the USB 2.0 contacts are arranged in a front row, and the tail portions of the extension contacts are arranged in a rear row. The tail portions of each row are arranged adjacent to each other along a transverse direction, and there is not adequate space to install other components. When a component is needed to be installed to an electrical connector, such as USB 3.0 connector, the components is needed to be notched for providing the tail portions enough space to extend through. As a result, the component is difficulty to be manufactured. In addition, it is disadvantage to change other components to the electrical connector.

Hence, an improved electrical connector is desired to overcome the above problems.

BRIEF SUMMARY OF THE INVENTION

According to one aspect of the present invention, an electrical connector defining a receiving opening for receiving a corresponding plug, comprises: an insulative housing having a tongue extending to the receiving opening; a plurality of contacts attached to the insulative housing, the contacts comprising a plurality of first contacts and a plurality of second contacts, each first contact having a first tail portion, a flexible first contact portion extending to the receiving opening, and a first body portion connecting the first contact portion and the first tail portion together, each second contact having a second tail portion, a stiff second contact portion exposed to the receiving opening, and a second body portion connecting the second contact portion and the second tail portion together, the first tail portions of the first contacts being aligned with each other along an inserting direction of the plug, and the second tail portions of the second contacts being aligned with each other along the inserting direction and parallel to the first tail portions; and an optical module retained on the insulative housing and located between the first tail portions and the second tail portions; wherein a distance between the first tail portions and the second tail portions along a transverse direction of the insulative housing is larger than a width of the first and second contact portions along the transverse direction.

According to another aspect of the present invention, an electrical connector defining a receiving opening for receiving a corresponding plug, comprises: an insulative housing having a tongue extending to the receiving opening and a cavity under the tongue and communicating with the receiving opening; an optical module retained in the cavity and having an optical component extending toward the receiving opening; and a plurality of contacts attached to the insulative housing, each contact having a contact portion extending to the tongue and exposed to the receiving opening, a tail portion and a body portion connecting the contact portion and the tail portion; wherein the tail portions of the contacts are arranged in rows along an inserting direction of the plug and located at an outside position of the optical module.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
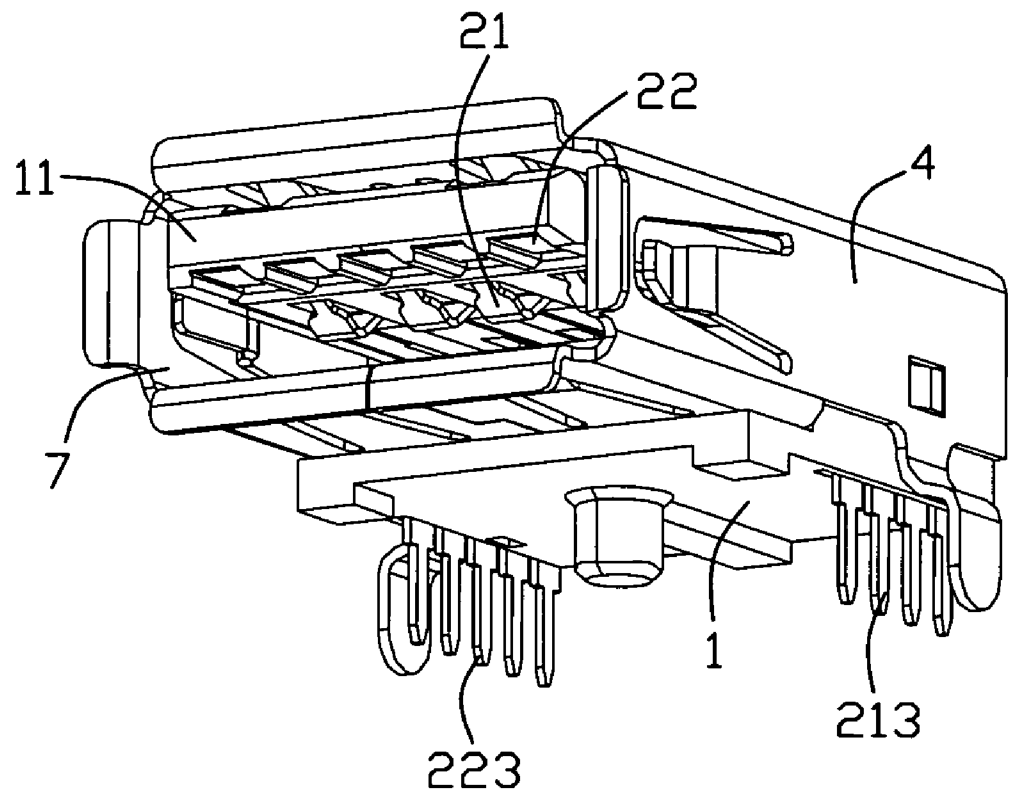
FIG. 1 is a perspective view of an electrical connector according to the present invention.
Figure 2:
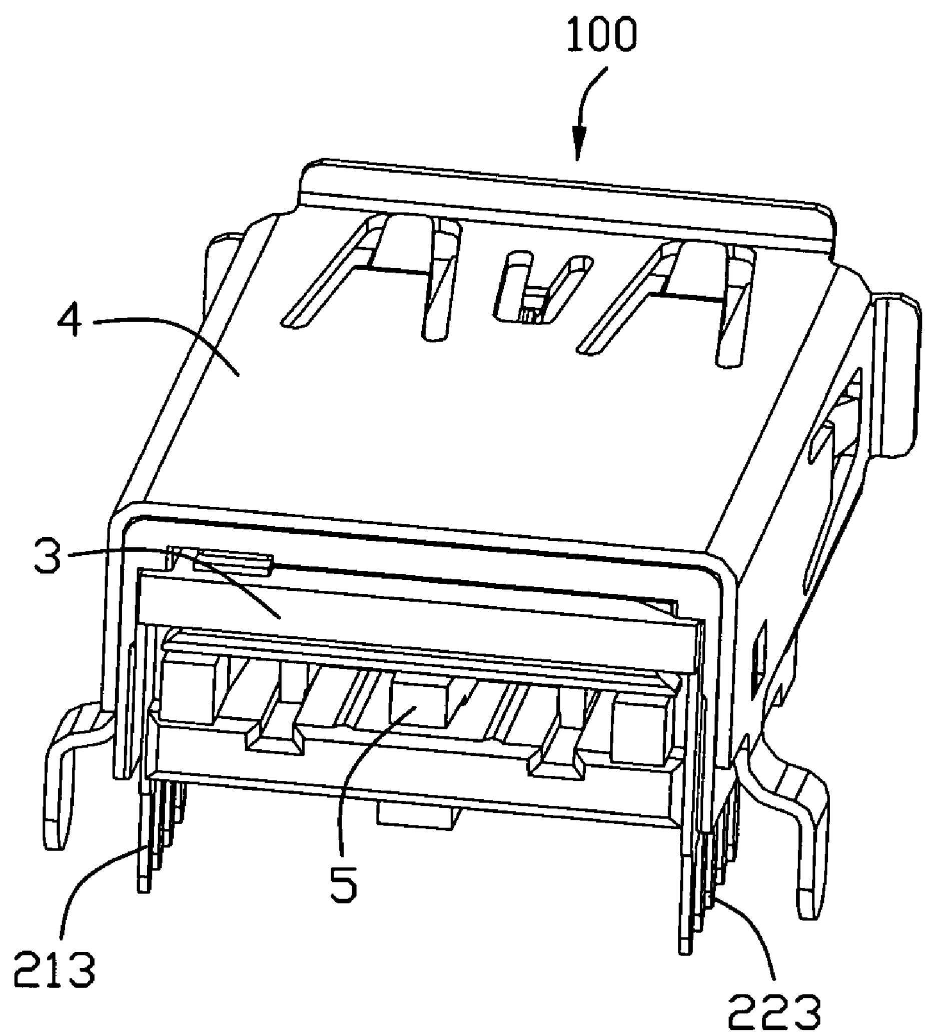
FIG. 2 is a view similar to FIG. 1, while taken from a different aspect.
Figure 3:
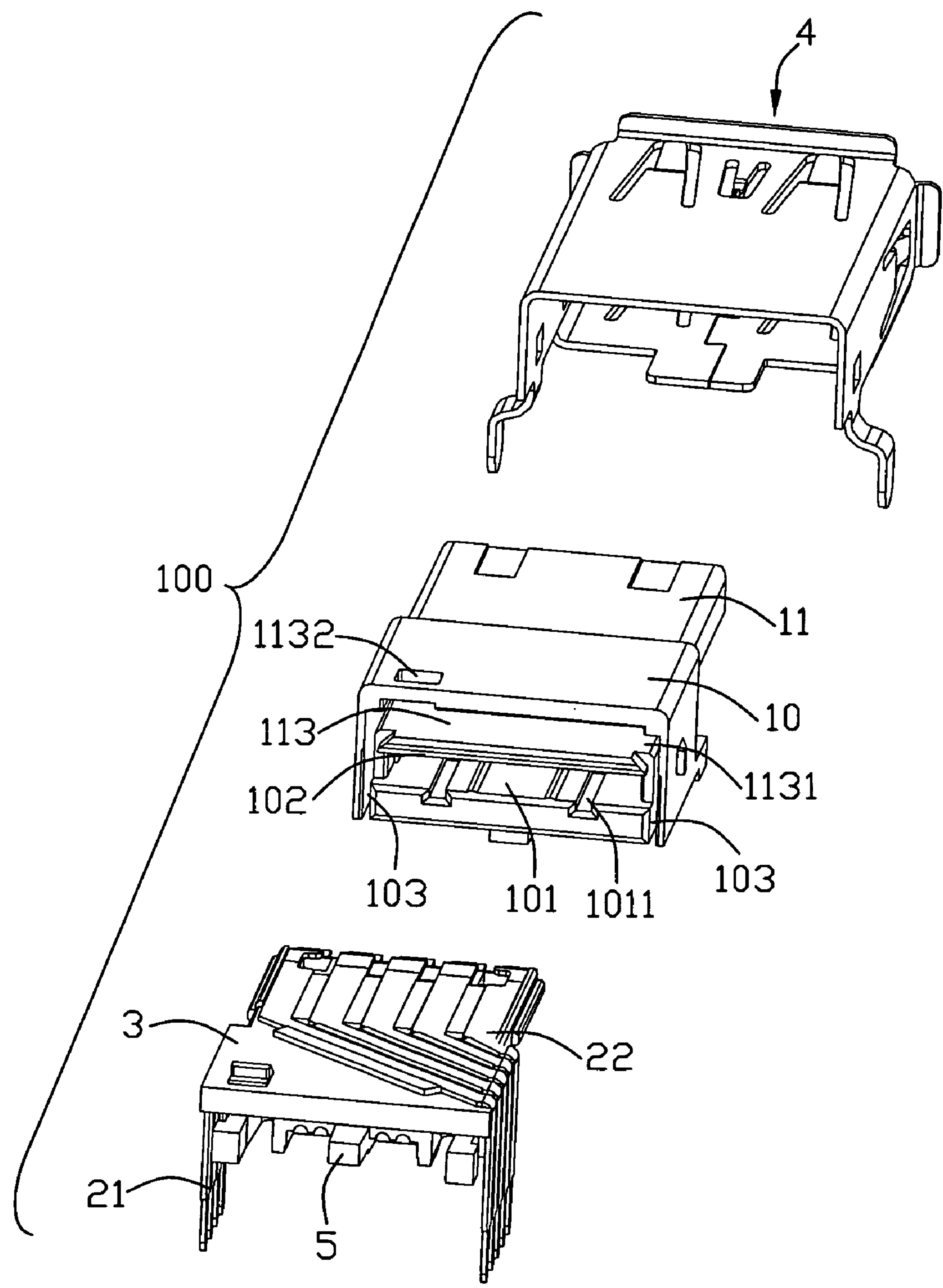
FIG. 3 is a partly exploded view of the electrical connector in the present invention.
Figure 4:
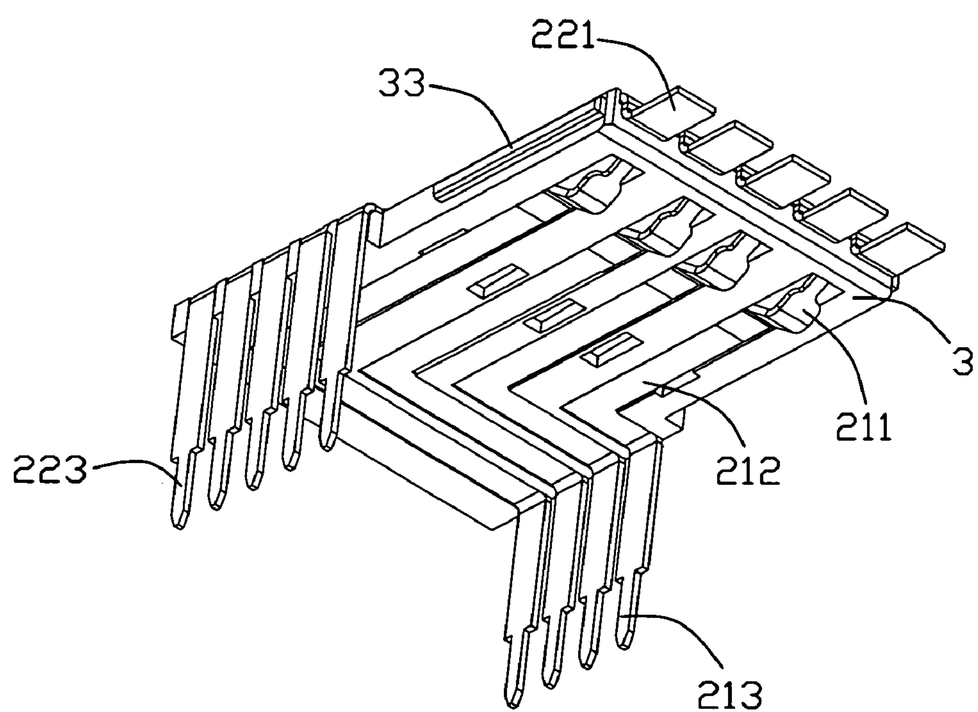
FIG. 4 is a perspective view of a clapboard with a plurality of contacts retained thereon of the electrical connector.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Referring to FIGS. 1-6, an electrical connector 100 for soldering to a circuit board (not shown) is an optical/electrical connector and comprises an insulative housing 1, a plurality of contacts 2 attached to the insulative housing 1, a clapboard 3 for positioning the contacts 2, a metal shell 4 covering the insulative housing 1 and an optical module 5 retained in the insulative housing 1. The electrical connector 100 defines a receiving opening 7 for receiving a corresponding plug (not shown).

The insulative housing 1 has a base portion 10 located at a rear position of the receiving opening 7, a tongue 11 and an assistant board 12 respectively projecting forwardly from an upper side and a lower side of the base portion 10. The tongue 11 defines a plurality of recesses 111 recessed from a front side of a lower surface thereof and a plurality of protrusions 112 at two sides of each recess 111. The tongue 11 defines a rectangular receiving room 113 behind the recesses 111 and extending through the base portion 10. The tongue 11 defines a pair of depressed portion 114 recessed from an upper surface thereof. A pair of guiding slots 1131 are recessed from two opposite inside walls of the receiving room 113. The guiding slots 1131 extend along a front-to-back direction and communicate with the receiving room 113 for guiding the clapboard 3 to be assembled to the receiving room 113.

The base portion 10 defines a through hole 1132 recessed from a top wall thereof and communicating with the receiving room 113 for engaging with the clapboard 3. A cavity 101 below the receiving room 113 extends through the base portion 10 along the front-to-back direction for receiving the optical module 5. The base portion 10 has a separate wall 102 between the receiving room 113 and the cavity 101 for separating the receiving room 113 and the cavity 101 from each other. A pair of orbits 1011 are depressed from a bottom wall of the cavity 101. The orbits 1011 extend along the front-to-back direction for guiding the optical module 5 to be inserted into the cavity 101. A pair of slits 103 extend forwardly from two sides of a rear wall of the base portion 10. The slits 103 are located at outsides of the cavity 101 and communicate with the receiving room 113. The base portion 10 has a block 104 at two sides thereof for fixing the metal shell 4.

Figure 5:
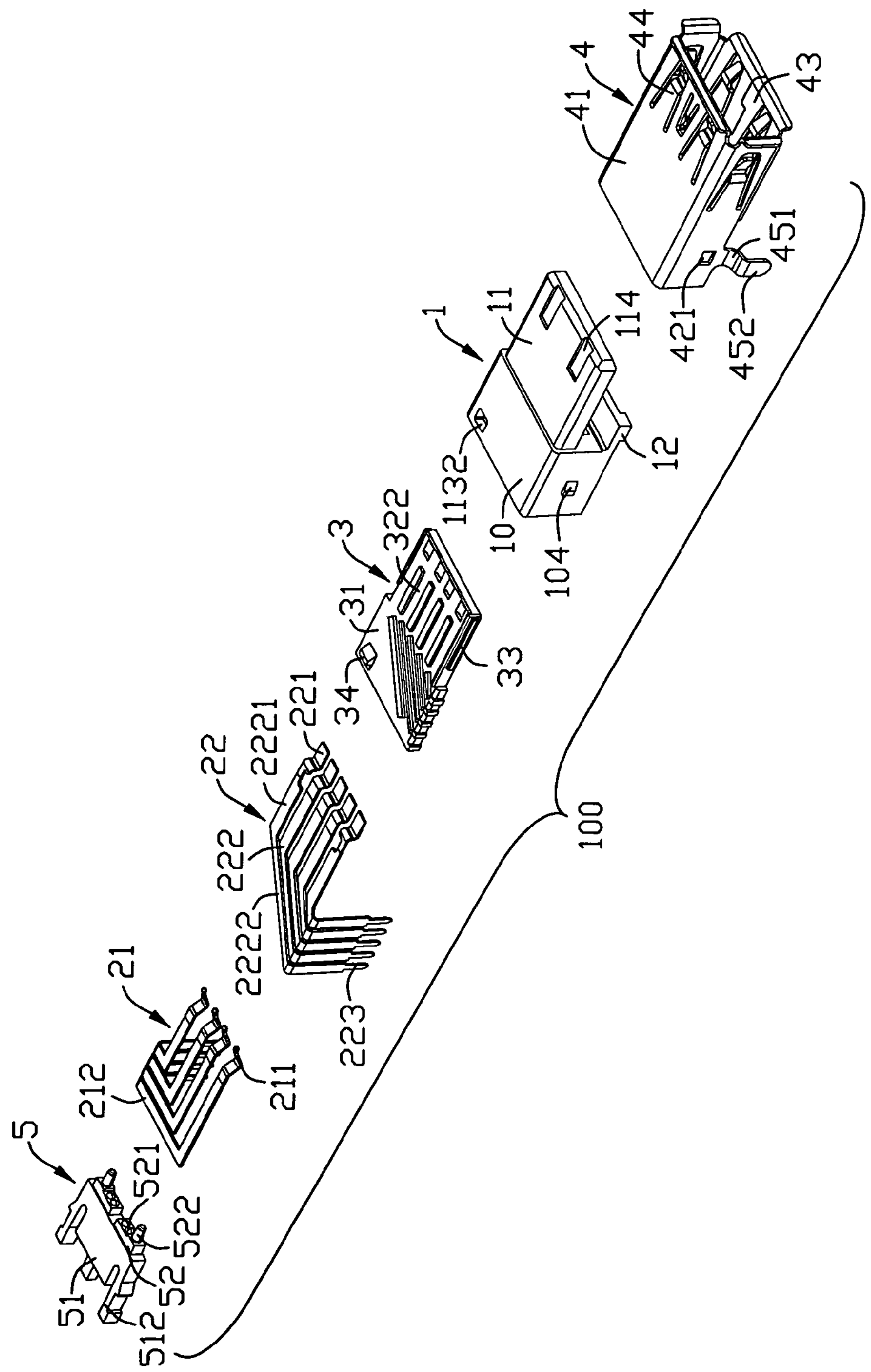
FIG. 5 is an exploded perspective view of the electrical connector shown in FIG. 1.
Figure 6:
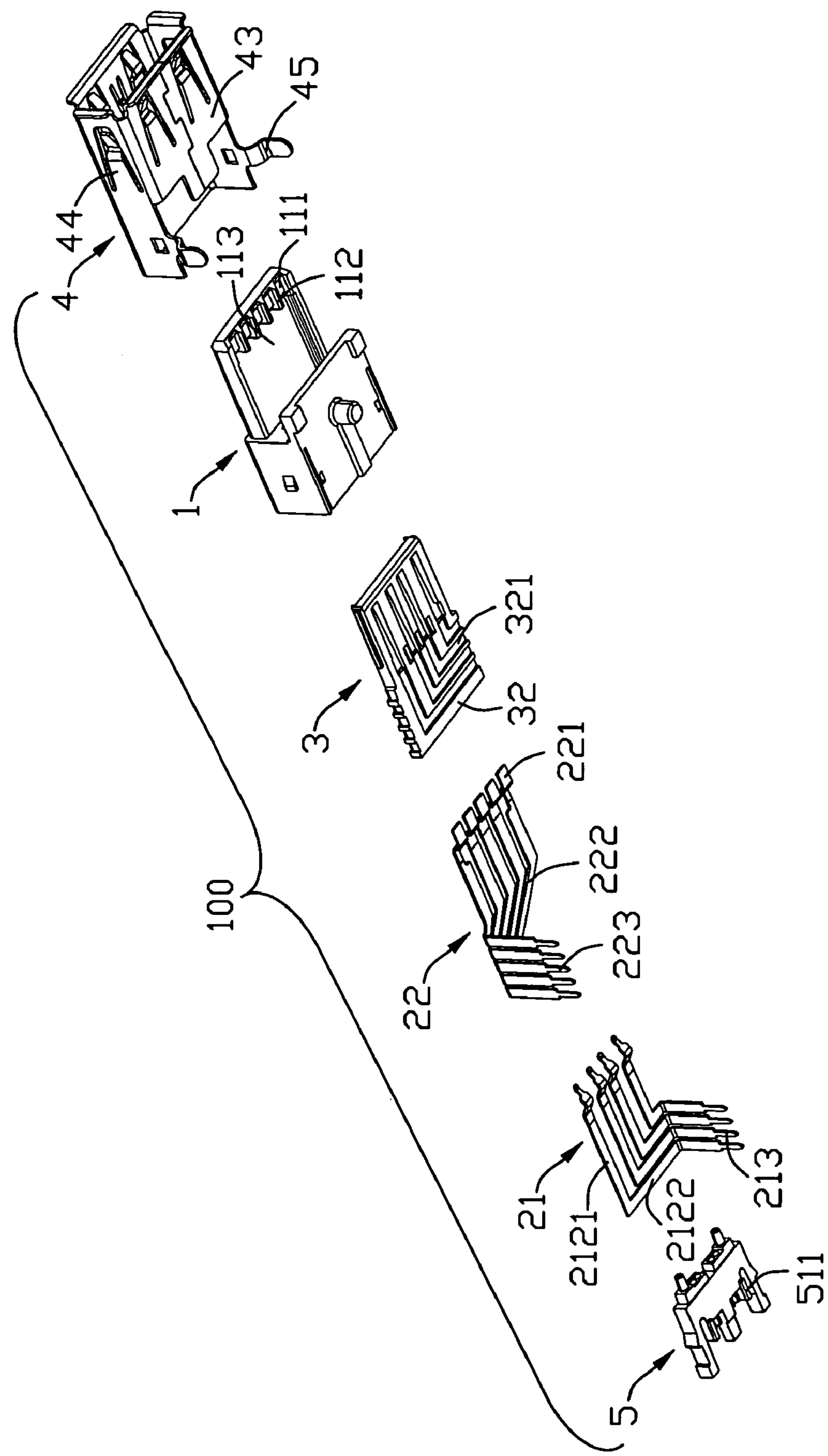
FIG. 6 is a view similar to FIG. 5, while taken from a different aspect.

Referring to FIGS. 5 and 6, the contacts 2 comprise a plurality of first contacts 21 and a plurality of second contacts 22. The first contacts 21 comprise a power contact, a grounding contact and a pair of differential contacts between the power contact and the grounding contact. The second contacts 22 comprise two pairs of differential contacts and a grounding contact between two pairs of differential contacts.

Each first contact 21 has a flexible first contact portion 211 extending to the receiving opening 7 for electrically connecting the corresponding plug, a first tail portion 213 for soldering to the circuit board, and a L-shaped first body portion 212 connecting the first contact portion 211 and the first tail portion 213 together. The first body portion 212 has a first extension portion 2121 extending backwardly and levelly from a rear end of the first contact portion 211, and a first transverse portion 2122 extending sidewardly from a rear end of the first extension portion 2121. The first tail portion 213 extends downwardly from a free end of the transverse portion 2122. Each second contact 22 includes a stiff second contact portion 221 extending to a front side of the tongue 11 for electrically connecting the corresponding plug, a second tail portion 223 for soldering to the circuit board, and a V-shaped second body portion 222 connecting the second contact portion 221 and the second tail portion 223 together. The second body portion 222 has a second extension portion 2221 extending downwardly and backwardly from a rear end of the second contact portion 221, and a second inclined portion 2222 extending sidewardly and obliquely from a rear end of the second extension portion 2221. The second tail portions 223 extend downwardly from a free end of the second inclined portions 2222.

The first contact portions 211 are located in a lower side of the tongue 11 and arranged in a row along a transverse direction of the insulative housing 1. The second contact portions 221 are received in the recesses 111 and exposed toward the receiving opening 5, therefore, the second contact portions 221 are arranged in another row along the transverse direction and located at a front side of the first contact portions 211. The first and second contact portions 211, 221 are all arranged in a same side of the tongue 11 and arranged in two rows along the inserting direction which is compatible to a contact arrangement of a standard USB 3.0 A type receptacle.

The first transverse portions 2122 are arranged in a row along the inserting direction, and each first transverse portion 2122 defines a width along a transverse direction which is increased one by one along the inserting direction, wherein the first transverse portion 2122 located at a right position is narrower than that located at a left position for separating the first body portions 212 from each other and not intersecting with each other. A sideward direction along which the first transverse portions 2122 extend is opposite to extending direction of the second inclined portions 2222. The first body portions 212 and the second body portions 222 are located at two parallel planes respectively. The first tail portions 213 are aligned with each other along the inserting direction, and the second tail portions 223 are aligned with each other along the inserting direction too, thereby, the first tail portions 213 and the second tail portions 223 are arranged in two rows along the inserting direction and parallel to each other. A distance between two rows of the first tail portions 213 and the second tail portions 214 along the transverse direction is larger than a width of the first and second contact portions 211, 221 along the transverse direction. The first tail portions 213 are received in the slit 103 which is located at a right side of the base portion 10, and the second tail portions 223 are received in the slit 103 which is located at a left side of the base portion 10, therefore, a reasonable space is formed between two rows tail portions 213, 223 for assembling other components, such as the optical module 5 in the present invention therein, and the optical module 5 need not to be notched at a front end thereof, is easily to be produced and convenient to be changed.

The clapboard 3 is a rectangular insulator which is retained in the receiving room 113. The clapboard 3 has an upper surface 31, a lower surface 32, and a pair of ribs 33 extending along the front-to-back direction at two sides thereof. The clapboard 3 has a projection 34 extending upwardly from a rear side of the upper surface 31. The projection 34 engages with the through hole 1132 of the base portion 10 for preventing the clapboard 3 from moving in the receiving room 113. The clapboard 3 defines a plurality of L-shaped first passageways 321 recessed from the lower surface 32 for receiving the first contact portions 211 and the first body portions 212, and a plurality of V-shaped second passageways 322 recessed from the upper surface 31 for receiving the second body portions 222. The first passageways 321 extend along the front-to-back direction and the transverse direction and have a structure which is compatible to that of the first contact portions 211 and the first body portions 212. The second passageways 322 have a structure which is compatible to that of the second body portions 222. Therefore, the first and second contacts 21, 22 can be assembled to the clapboard 3 with the second contact portions 221 extending beyond the clapboard 3 in order to form a contact module before the clapboard 3 and the contacts 2 installed to the insulative housing 1. As a result, the contacts 2 can be assembled to the insulative housing 1 easily. In addition, the clapboard 3 is located between the first body portions 212 and the second body portions 222 for preventing the first and second contacts 21, 22 from crosstalk.

The optical module 5 includes a main body 51 retained in the cavity 101, and a pair of optical components 52 extending forwardly from the main body 51 and exposed toward the receiving space 7. Each optical component 52 has a pair of lens 521 and a post 522 extending forwardly and located at outside of the lens 521. The lens 521 can be coupled with fibers (not shown) connected to the circuit board for transmitting high speed optical signals. The main body 51 has a pair of guiding blocks 511 extending along the front-to-back direction, and a pair of spring arms 512 at two sides thereof. The guiding blocks 511 move in the orbits 1011 forwardly for guiding the optical module 5 to be assembled in the cavity 101. The spring arms 512 engages with inside wall of the cavity 101 for fixing the optical module 5 in the cavity 101.

The metal shell 4 comprises a top wall 41, a pair of side walls 42 bending downwardly from two sides of the top wall 41, and a bottom wall 43 extending inwardly from a lower end of the side walls 42 and coupled together. The top wall 41, bottom wall 43 and two side walls 42 enclose the tongue 11 and form the receiving space 7 with the tongue 11. Each top wall 41, bottom wall 43 and two side walls 42 has at least a spring tab 44 extending forwardly for engaging with the corresponding plug. Each side wall 42 defines a locking hole 421 engaging with the block 104 for fastening the metal shell 4 to the insulative housing 1. The metal shell 4 has a pair of mounting legs 45 extending downwardly from the lower end of the side walls 42 respectively. Each mounting leg 45 has a bending portion 451 extending outwardly and apart from the tail portions 213, 223, and a vertical portion 452 extending downwardly form the bending portion 451 to engage with the circuit board.

As fully described above, the first tail portions 213 and the second tail portions 223 are arranged in two rows along the inserting direction and located at two sides of insulative housing 1, as a result, a much integral space between the two rows tail portions 213, 223 can be provided for receiving the optical module 5, therefore, the optical module 5 can be manufactured easily, assembled conveniently and changed easily. Of course, the first tail portions 213 and the second tail portions 223 can be arranged in other fashions, such as assigning the first and second tail portions 213, 223 in two groups, wherein the tail portions 213, 223 of each group comprise several first tail portions 213 and several second tail portions 223 which are arranged in a row along the inserting direction and located at outside of the optical module 5, which can carry the present invention's point also.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An electrical connector defining a receiving opening for receiving a corresponding plug, comprising:

an insulative housing having a tongue extending to the receiving opening;

a plurality of contacts attached to the insulative housing, the contacts comprising a plurality of first contacts and a plurality of second contacts, each first contact having a first tail portion, a flexible first contact portion extending to the receiving opening, and a first body portion connecting the first contact portion and the first tail portion together, each second contact having a second tail portion, a stiff second contact portion exposed to the receiving opening, and a second body portion connecting the second contact portion and the second tail portion together, the first tail portions of the first contacts being aligned with each other along an inserting direction of the plug, and the second tail portions of the second contacts being aligned with each other along the inserting direction and parallel to the first tail portions; and an optical module retained on the insulative housing and located between the first tail portions and the second tail portions;

wherein a distance between the first tail portions and the second tail portions along a transverse direction of the insulative housing is larger than a width of the first and second contact portions along the transverse direction wherein the second body portion has a second extension portion extending upwardly and backwardly from a rear end of the second contact portion and a second inclined portion extending obliquely and sidewardly from a rear end of the second extension portion.

2. The electrical connector as claimed in claim 1, wherein the first body portion has a first extension portion extending backwardly from a rear end of the first contact portion, a first transverse portion extending sidewardly from a rear end of the first extension portion, each first transverse portion defines a width along the transverse direction which is increased one by one along the inserting direction.

3. The electrical connector as claimed in claim 2, wherein a sideward direction along which the first transverse portions extend is opposite to a direction along which the second inclined portions extend, and the first transverse portions and the second inclined portions are located at two parallel planes.

4. The electrical connector as claimed in claim 1, wherein the insulative housing defines two slits extending inwardly from two sides of a rear wall thereof for positioning the first tail portions and the second tail portions respectively.

5. The electrical connector as claimed in claim 4, wherein the insulative housing has a base portion at a rear position of the receiving opening, the tongue projects forwardly from the base portion, the tongue defines a plurality of recesses at a front side thereof for receiving the second contact portions, and a receiving room behind the recesses extending through the base portion, the electrical connector comprises a clapboard retained in the receiving room and located between the first body portions and the second body portions.

6. The electrical connector as claimed in claim 5, wherein the clapboard defines a plurality of first passageways extending along a front-to-back direction and the transverse direction at a lower side thereof for receiving the first contact portions and the first body portions, and a plurality of second passageways corresponding to the second body portions at an upper side thereof for receiving the second body portions.

7. The electrical connector as claimed in claim 5, wherein the slits communicate with the receiving room along a top-to-down direction.

8. The electrical connector as claimed in claim 5, wherein the base portion defines a cavity extending therethrough and located between two slits and under the receiving room for positioning the optical module, the cavity communicates with the receiving opening.

9. The electrical connector as claimed in claim 8, wherein the optical module has a main body retained in the cavity and an optical component extending toward the receiving opening.

10. The electrical connector as claimed in claim 1, wherein the first contact portions of the first contacts and the second contact portions of the second contacts are arranged in a same side of the tongue and offset from each other along the inserting direction which is compatible to a contact arrangement of a standard USB 3.0 A type receptacle.

11. An electrical connector defining a receiving opening for receiving a corresponding plug, comprising:

an insulative housing having a tongue extending to the receiving opening and a cavity under the tongue and communicating with the receiving opening;

an optical module retained in the cavity and having an optical components extending toward the receiving opening; and a plurality of contacts attached to the insulative housing, each contact having a contact portion extending to the tongue and exposed to the receiving opening, a tail portion and a body portion connecting the contact portion and the tail portion; wherein the tail portions of the contacts are arranged in rows along an inserting direction of the plug and located at an outside position of the optical module wherein the body portions comprise a plurality of first body portions and a plurality of second body portions, each first body portion extending backwardly from a rear end of the contact portion, and a first transverse portion extending sidewardly from a rear end of the first extension portion, each second body portion has a second extension portion extending backwardly from a rear end of the contact portion and a second inclined portion extending sidewardly, obliquely and opposite to the first transverse portion from the second extension portion.

12. The electrical connector as claimed in claim 11, wherein the tail portions comprise a plurality of first tail portions bending downwardly from the first transverse portion and a plurality of second tail portions bending downwardly from the second inclined portion, the first tail portions and the second tail portions are arranged in two rows and located at two sides of the optical module respectively, the insulative housing defines two slits at two sides of the cavity for positioning the first and second tail portions.

13. The electrical connector as claimed in claim 12, wherein the insulative housing has a base portion at a rear position of the receiving opening, the tongue projects forwardly from the base portion, the tongue defines a plurality of recesses at a front side thereof for receiving the second contact portions, a receiving room behind the recesses and extending through the base portion for receiving a clapboard, the contacts being assembled to the clapboard with the contact portions corresponding to the second body portions extending beyond the clapboard in order to form a contact module.

14. The electrical connector as claimed in claim 13, wherein the clapboard defines a plurality of first passageways corresponding to the first body portions and contact portions corresponding the first body portions at a lower side thereof for retaining the contacts corresponding the first body portions, and a plurality of second passageways corresponding to the second body portions at an upper side thereof for retaining the second body portions.

* * * * *